H. BRASSLER.
JEWELRY.
APPLICATION FILED OCT. 4, 1913.
1,099,484.
Patented June 9, 1914.
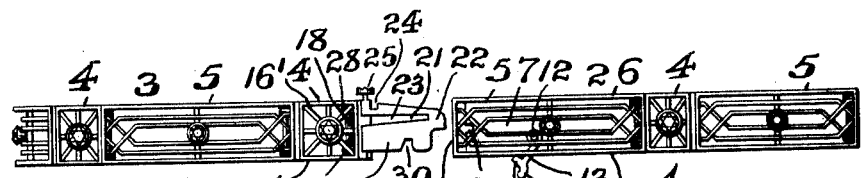
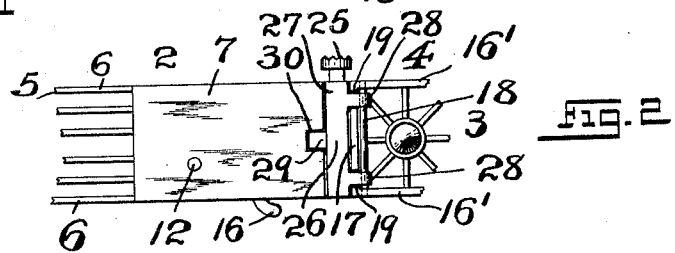
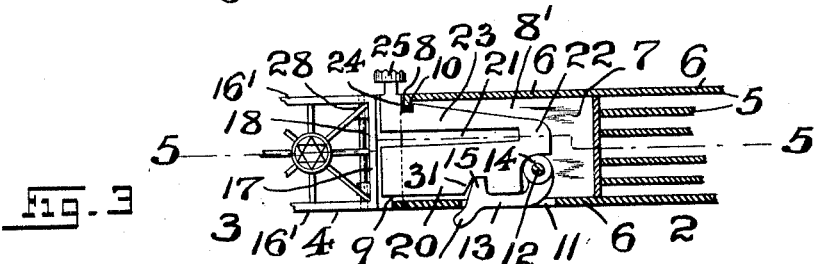
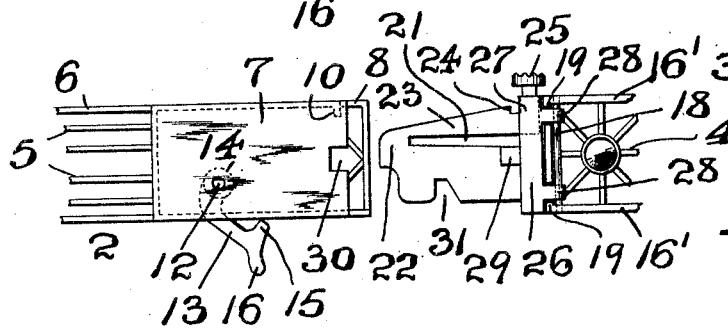
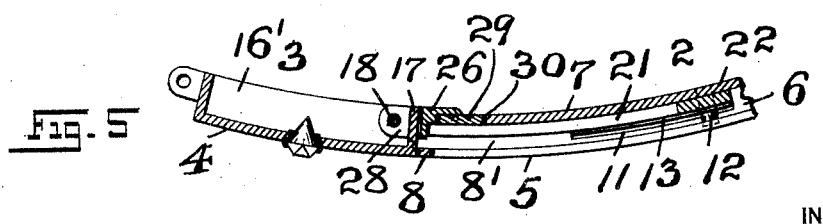
WITNESSES:
INVENTOR:
Hans Brassler,
BY
Fraentzel and Richards,
ATTORNEYS

UNITED STATES PATENT OFFICE.

HANS BRASSLER, OF SOUTH ORANGE, NEW JERSEY, ASSIGNOR TO THE BRASSLER COMPANY, A CORPORATION OF NEW JERSEY.

JEWELRY.

1,099,484. Specification of Letters Patent. Patented June 9, 1914.

Application filed October 4, 1913. Serial No. 793,294.

*To all whom it may concern:*

Be it known that I, HANS BRASSLER, a subject of the Emperor of Germany, residing at South Orange, in the county of Essex and State of New Jersey, have invented certain new and useful Improvements in Jewelry; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in safety-catches for jewelry; and, the present invention relates, more particularly, to a novel double-lock catch for jewelry, and which is especially adapted for use with the separable members of bracelets, necklaces, and the like.

The present invention has for its principal object to provide a novel and simply constructed double-lock catch for positively holding the separable parts or elements of a bracelet, necklace, and the like, against accidental separation; and, furthermore, to provide a device in the form of a safety-catch in which the engaging locking or holding member of the catch which is connected with and is secured within the end-portion of one element of the bracelet cannot be separated from the holding member of the other element of the bracelet, necklace, or the like, when accidentally bearing down upon the fingerpiece of the catch, while wearing the piece of jewelry.

The invention has for its further object to provide a novel spring-catch for jewelry, such as a bracelet, necklace, or the like, which is of such construction that the depressible spring-arm of the catch can readily be snapped or brought into its locked or holding engagement with the usual catching or holding member, to hold the two elements of the piece of jewelry in their closed or locked engagement; and the double safety-catch being also in holding engagement with the two members or elements of the piece of jewelry, so that said spring-arm can not be separated from the catching or holding member, unless the said safety-catch or link is first disengaged from its holding engagement with the one member or element of the bracelet, necklace, or the like, and the main holding or locking catch, as will hereinafter more fully appear.

Other objects of this invention not at this time more particularly enumerated will be clearly understood from the following detailed description of the present invention.

With the various objects of this invention in view, the said invention consists, primarily, in the novel double-lock safety-catch for jewelry, and especially for bracelets, necklaces, and the like; and, the invention consists, furthermore, in the novel arrangements and combinations of the several devices and parts, as well as in the details of the construction of the said parts, all of which will be more fully described in the following specification, and then finally embodied in the clauses of the claim which are appended to and which form an essential part of this specification.

The invention is clearly illustrated in the accompanying drawings, in which:—

Figure 1 is a front view of a bracelet illustrating one embodiment of the principles of the present invention and showing the two members or elements of the bracelet in their unlocked or separated positions. Fig. 2 is a large back view of the double safety-catch, the two separable members or elements of the bracelet being shown in their locked or closed relation; and Fig. 3 is a view of the two separable members or elements of the bracelet and the double safety-catch in their locked relation, one of said bracelet-members being represented in section. Fig. 4 is a large back view of the two bracelet-members or elements and the safety-catch, showing the members or elements of the bracelet in their unlocked or separated relation; and Fig. 5 is a horizontal sectional representation of the connected members of the bracelet, said section taken on line 5—5 in said Fig. 3.

Similar characters of reference are employed in all of the above described views, to indicate corresponding parts.

Referring now to the several figures of the drawings, the reference-character 1 indicates a piece of jewelry, as a bracelet of any ornamental design, the bracelet comprising the bracelet-members or end-portions 2 and 3 which are adapted to be separably connected by means of the double safety-catch of the general construction hereinafter more particularly set forth.

In the present construction, the bracelet is made in the form of pivotally connected ornamental box-like elements, 4 and 5, the box-like element 5 at the end-portion 2 of the bracelet having secured upon the rear face-portions of its surrounding side-members 6, a suitably-shaped plate 7 which forms with the said element 5 a catch-receiving chamber, as will be clearly evident. The marginal end-member 8 of the element 5 is suitably cut away, as at 9, so as to provide a suitable receiving portion over which the holding or locking catch, to be presently described, slides as it enters the catch-receiving chamber 8'.

The part indicated by the reference-character 10 provides a suitable holding element, with which a part of one of the edge-portions of the holding or locking catch is adapted to be sprung into holding engagement in the manner hereinafter more fully described. The side-member 6, located opposite the side-member with which the holding member 10 is connected, is also cut away, as at 11, so as to provide a suitable opening, as will be evident from an inspection of Fig. 3 of the drawings, and located within the chamber 8', and suitably secured to the said plate 7, is a pivot-pin or stud 12, said pin or stud extending laterally across the said chamber. Pivotally mounted upon said pin or stud 12 is the eye-portion 14 of a suitably formed locking or holding lever 13, the straight portion of which is adapted to lie directly within the opening 11, when in its locked engagement with the main snap-catch, as clearly shown in said Fig. 3. Upon its free end-portion, the said lever is provided with an inwardly extending locking stud or projection, as 15, and with an outwardly projecting and suitably formed finger-piece 16.

Referring now to Figs. 2 and 4 of the drawings, it will be seen that the box-like element 4 which is surrounded by the side-members 16' and the end-members 17, has suitably arranged within its chambered portion and near the end-member 17, which is located at the extreme edge of the end-portion 3 of the bracelet, a suitably formed pivot-pin, as 18, said pin having its respective end-portions suitably secured to and connected with the respective side-members 16' of the box-like element 4, substantially as shown. The end-member 17 is also provided with cut-away or slotted parts 19.

The main holding or locking catch hereinabove mentioned consists, essentially, of a suitably formed main body 20, said body being longitudinally slotted, as at 21, so as to provide a connecting portion 22, and a rearwardly extending spring-finger 23 which is formed in its marginal edge, near its free end with a holding or retaining slot or depression, as 24, adapted, as shown in Fig. 3 of the drawings, to be snapped into holding or locked engagement with the previously-mentioned holding element 10. To disengage the said spring-finger 23 from its locked engagement with the said element 10, said finger is provided upon its free end-portion with an upwardly extending finger-piece, as 25, for forcing said spring-finger 23 downwardly into its released relation, as will be clearly understood. That the said main holding or locking catch may be operatively, and at the same time pivotally connected with the said box-like element 4, the said main body 20 is also made with a thickened part, as 26, and an upwardly extending portion 27, and extending from the respective parts 26 and 27 are perforated pivot-ears or lugs 28, which extend into and through the cut-away or slotted parts 19 in the end-member 17, and are pivotally connected with the pivot-pin 18.

Projecting laterally from one of the flat faces of the said main body 20 of the catch is a projection or extension, as 29, which enters a suitably disposed guide-slot 30 in the plate 7, when the catch enters the chamber 8', said projection 29 and slot causing a perfect registration of the various parts when the bracelet-members are brought into their closed relation, and causing also a more rigidly locked relation of the parts, as will be clearly evident. In its lower marginal edge-portion, the said main body 20 is provided with a recess or a cut-away portion 31 with which the locking stud or projection 15 of the safety lock-lever 13 can be brought into registration, in the manner indicated in Fig. 3 of the drawings, so as to provide a double safety-lock with the main snap-catch when the bracelet-members have been brought end to end in their closed relation.

The operation and manipulation of the various devices for bringing the bracelet-members into their closed and locked relation, and also for separating the same, will be clearly understood from the foregoing description of the present invention, and from an inspection of the accompanying drawings, and need not, therefore, be further described.

While I have shown the use of my double-lock safety-catch in connection with a bracelet, consisting of pivotally connected or hinged box-shaped elements or links, it will be understood that the double-lock safety-catch may be used with the usual rigid and tubular bracelet-members, or with any other desired form of bracelet. It will also be evident, that the double-lock safety-catch may be used for separably connecting chain-like members, such as are employed in the manufacture of necklaces, or other pieces of jewelry, and other articles of manufacture.

I am aware, therefore, that changes may be made in the arrangements and combinations of the various devices and parts, as well as in the details of the construction of the same, without departing from the scope of the present invention as set forth in the foregoing specification and as defined in the clauses of the claim which are appended thereto. Hence, I do not limit my present invention to the exact arrangements and combinations of the various devices and parts as described in the said specification, nor do I confine myself to the exact details of the construction of the said parts, as illustrated in the accompanying drawings.

I claim:—

1. In a bracelet or the like, in combination with a pair of end-members comprising box-like elements surrounded by marginal side-portions and end-portions, a plate upon the back of one of said box-like elements forming with the same a snap-catch-receiving chamber, a pin connected with the other box-like element having its ends secured to the side-portions of said last-mentioned box-like element and located near the end-portion thereof, said end-portion being provided with slots, a snap-catch consisting of a main body, perforated ears extending from said body, said ears being arranged in said slots and being pivotally connected with said pin, and a spring-arm also connected with said body, a snap-catch holding element connected with the other box-like element, said spring-arm being provided with a locking recess adapted to be sprung into holding engagement with said snap-catch holding element, said main body being further provided with a lock-stud receiving recess, a lock-lever pivotally connected with said above-mentioned plate, a lock-stud connected with said lock-lever, said lock-stud being adapted to enter said lock-stud receiving recess to additionally lock said snap-catch, and a fingerpiece on said lock-lever, substantially as and for the purposes set forth.

2. In a bracelet or the like, in combination with a pair of end-members comprising box-like elements surrounded by marginal side-portions and end-portions, a plate upon the back of one of said box-like elements forming with the same a snap-catch-receiving chamber, a pin connected with the other box-like element having its ends secured to the side-portions of said last-mentioned box-like element and located near the end-portion thereof, said end-portion being provided with slots, a snap-catch consisting of a main body, perforated ears extending from said body, said ears being arranged in said slots and being pivotally connected with said pin, and a spring-arm also connected with said body, a snap-catch holding element connected with the other box-like element, said spring-arm being provided with a locking recess adapted to be sprung into holding engagement with said snap-catch holding element, said main body being further provided with a lock-stud receiving recess, a lock-lever pivotally connected with said above-mentioned plate, a lock-stud connected with said lock-lever, said lock-stud being adapted to enter said lock-stud receiving recess to additionally lock said snap-catch, a fingerpiece on said lock-lever, said plate being also provided with a guide-slot, and a guide-projection extending from the side of said spring-catch, said guide-projection being adapted to enter said guide-slot, substantially as and for the purposes set forth.

In testimony, that I claim the invention set forth above I have hereunto set my hand this 30th day of September, 1913.

HANS BRASSLER.

Witnesses:
    FREDK. C. FRAENTZEL,
    FREDK. H. W. FRAENTZEL.

---

Copies of this patent may be obtained for five cents each, by addressing the "Commissioner of Patents, Washington, D. C."